United States Patent
White et al.

(10) Patent No.: US 8,347,334 B2
(45) Date of Patent: Jan. 1, 2013

(54) SYSTEM AND METHOD OF RECORDING TELEVISION CONTENT

(75) Inventors: Scott White, Austin, TX (US); James L. Cansler, Pflugerville, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 949 days.

(21) Appl. No.: 12/023,714

(22) Filed: Jan. 31, 2008

(65) Prior Publication Data

US 2009/0199237 A1    Aug. 6, 2009

(51) Int. Cl.
*H04N 5/445*    (2011.01)

(52) U.S. Cl. .............. 725/53; 725/39; 725/50

(58) Field of Classification Search .......... 725/39, 725/44–46, 50, 53, 58
See application file for complete search history.

(56) References Cited

U.S. PATENT DOCUMENTS

| | | | |
|---|---|---|---|
| 2002/0023082 A1* | 2/2002 | Maze et al. | 707/3 |
| 2003/0074671 A1* | 4/2003 | Murakami et al. | 725/109 |
| 2003/0204848 A1* | 10/2003 | Cheng et al. | 725/58 |
| 2004/0117831 A1* | 6/2004 | Ellis et al. | 725/53 |
| 2004/0123319 A1 | 6/2004 | Kim | |
| 2004/0210932 A1 | 10/2004 | Mori et al. | |
| 2007/0209049 A1 | 9/2007 | Kelly et al. | |

* cited by examiner

*Primary Examiner* — Nicholas Corbo (74) *Attorney, Agent, or Firm* — Guntin & Gust, PLC; Andrew Gust (57) ABSTRACT

A method of recording television content is disclosed and includes receiving one or more television program search criteria from a set-top box device at a recurrent searching system. The method also includes storing the one or more search criteria at the recurrent searching system. Further, the method includes performing a first search of electronic program guide (EPG) data accessible to the recurrent searching system based on the television program search criteria and performing at least one additional search of EPG data accessible to the recurrent searching system based on the television program search criteria after the first search.

20 Claims, 8 Drawing Sheets

SYSTEM AND METHOD OF RECORDING TELEVISION CONTENT

FIELD OF THE DISCLOSURE

The present disclosure generally relates to recording television content.

BACKGROUND

Television service providers typically offer a wide variety of content to subscribers. A subscriber may be interested in several types of content but may not have time to watch initial airings of some programs. Hence, the subscriber may desire to record programs that he or she would otherwise miss.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed methods, systems or computer-readable media. Moreover, some statements may apply to some inventive features but not to others.

Figure 1:
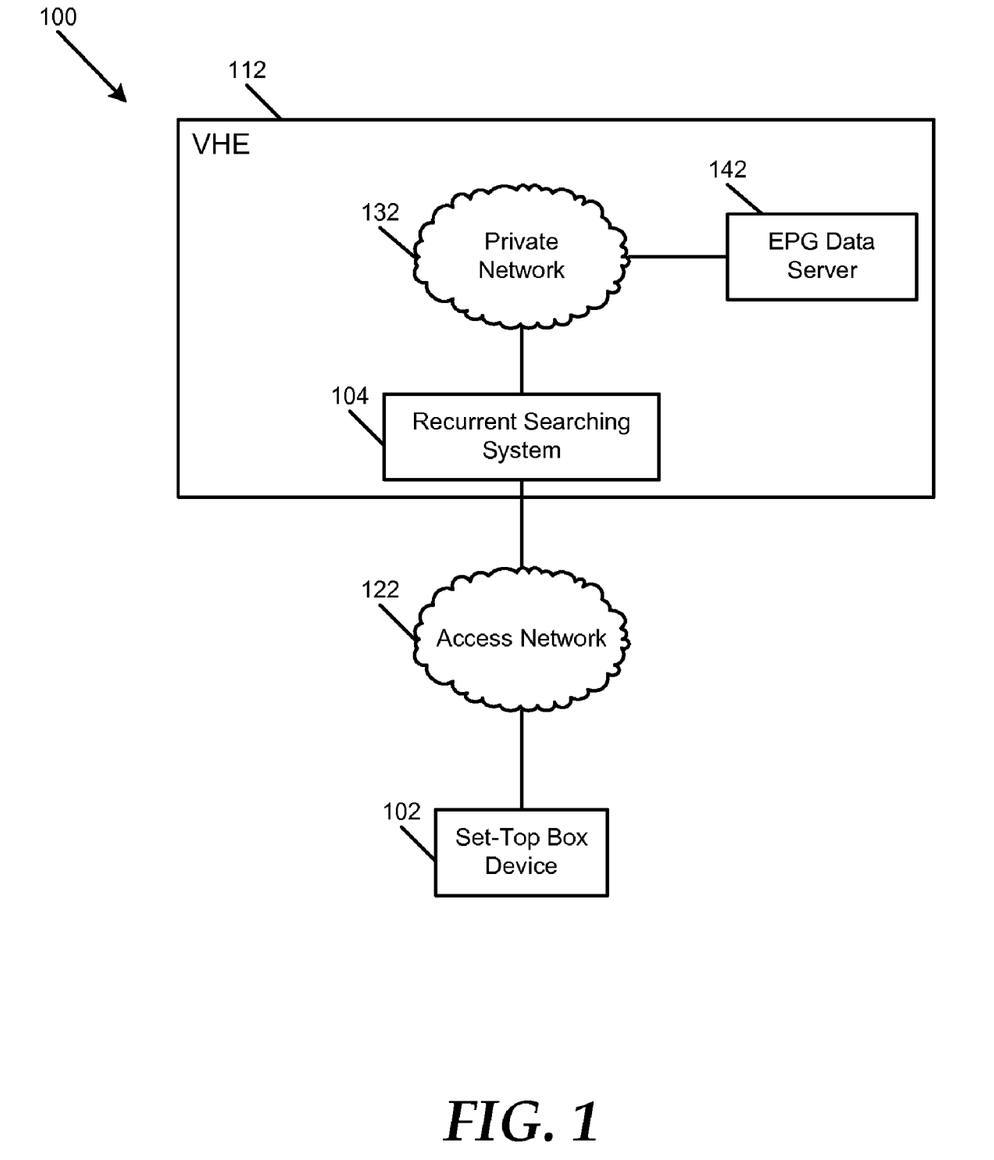
FIG. 1 is a block diagram illustrating a particular embodiment of a system to record television content.

FIG. 1 illustrates a particular embodiment of a system 100 to record television content. The system 100 includes a set-top box device 102 that communicates with a recurrent searching system 104 at a video head-end 112 of a television service provider, via a television service provider access network 122. The recurrent searching system 104 can include one or more servers, switches, databases, other network elements, or any combination thereof. The video head-end 112 also includes an electronic program guide (EPG) data server 142 that communicates with the recurrent searching system 104. In one embodiment, the EPG data server 142 can communicate with the recurrent searching system 104 via a private network 132 at the video head-end 112.

The set-top box device 102 is adapted to receive input from a user specifying one or more television program search criteria, such as a keyword, an actor name, a subject, a time, a date, other television program search criteria, or any combination thereof. The set-top box device 102 is adapted to send data corresponding to the one or more television program search criteria to the recurrent searching system 104 via the access network 122. Alternatively, the set-top box device 102 can be adapted to send the one or more television program search criteria to the recurrent searching system 104 via a data network (not shown) that is separate from the access network 122, such as a broadband Internet Protocol network. The recurrent searching system 104 is adapted to receive the one or more television program search criteria from the set-top box device 102 and to store the one or more television program search criteria.

In a particular embodiment, the recurrent searching system 104 is adapted to recurrently search EPG data stored at the recurrent searching system 104, the EPG data server 142, or a combination thereof, based on the one or more television program search criteria. For example, the recurrent searching system 104 can be adapted to search EPG data that is accessible to the recurrent searching system 104 when data corresponding to television program search criteria is received from the set-top box device 102. Moreover, the recurrent searching system 104 can be adapted to perform at least one additional search of EPG data that is accessible to the recurrent searching system 104 at the end of one or more recurrent searching periods, when new EPG data is accessible to the recurrent searching system 104 (e.g., when EPG data at the EPG data server 142 or the recurrent searching system 104 is added to or otherwise updated), or any combination thereof.

Further, the recurrent searching system 104 can be adapted to determine whether EPG data indicates that one or more television programs match or otherwise satisfy the television program search criteria associated with the set-top box device 102. The recurrent searching system 104 is adapted to instruct the set-top box device 102 to record, or cause a device coupled to the set-top box device 102 to record, the one or more matching television programs. The set-top box device 102 is adapted to record the one or more television programs or to instruct a digital video recorder (DVR) or other device to record the one or more television programs. In another embodiment, the set-top box device 102 can output program recommendations that include the one or more matching television programs via a display device (not shown) coupled to the set-top box device 102, and a user can select which television program(s) to record.

In another particular embodiment, the recurrent searching system 104 can be adapted to recurrently instruct the set-top box device 102 to search EPG data stored at the set-top box device 102, at the EPG data server 142, or a combination thereof. For instance, the recurrent searching system 104 can be adapted to send data to the set-top box device 102 corresponding to a command to search EPG data that is accessible to the set-top box device 102 when television program search criteria are received from the set-top box device 102, when a searching recurrent searching period has ended, when the recurrent searching system 104 receives data indicating that new EPG data is accessible to the set-top box device 102 (e.g., when EPG data at the EPG data server 142 or the set-top box device 104 is added to or otherwise updated), or a combination thereof. The recurrent searching system 104 is also adapted to send one or more stored television program search criteria associated with the set-top box device 102 with each command to perform a search of EPG data based on the one or more television program search criteria. The set-top box device 102 can be adapted to determine whether the EPG data indicates that any television programs match or otherwise satisfy the television program search criteria and to record such television programs, to cause such television programs to be recorded, to output program recommendations that include such television programs, or any combination thereof.

In addition, the recurrent searching system 104 can be adapted to change the one or more television program search criteria in response to a request received from the set-top box device 102. For example, the set-top box device 102 can receive input from a user indicating that the one or more television program search criteria are to be changed and specifying new television program search criteria. The recurrent searching system 104 can be adapted to receive data corresponding to new television program search criteria from the set-top box device 102. The recurrent searching system 104 can also be adapted to perform recurrent searches of EPG data based on the new television program search criteria and to instruct the set-top box device 102 to record television programs satisfying the television program search criteria or to cause such television programs to be recorded. Alternatively, the recurrent searching system 104 can be adapted to send data corresponding to the new television program search criteria to the set-top box device 102 with recurrent commands for the set-top box device 102 to perform a search of EPG data. Further, the recurrent searching system 104 is adapted to delete television program search criteria in response to a request received from the set-top box device 102, such as a request to delete such television program search criteria or a request to discontinue recurrent searching based on the television program search criteria.

Figure 2:
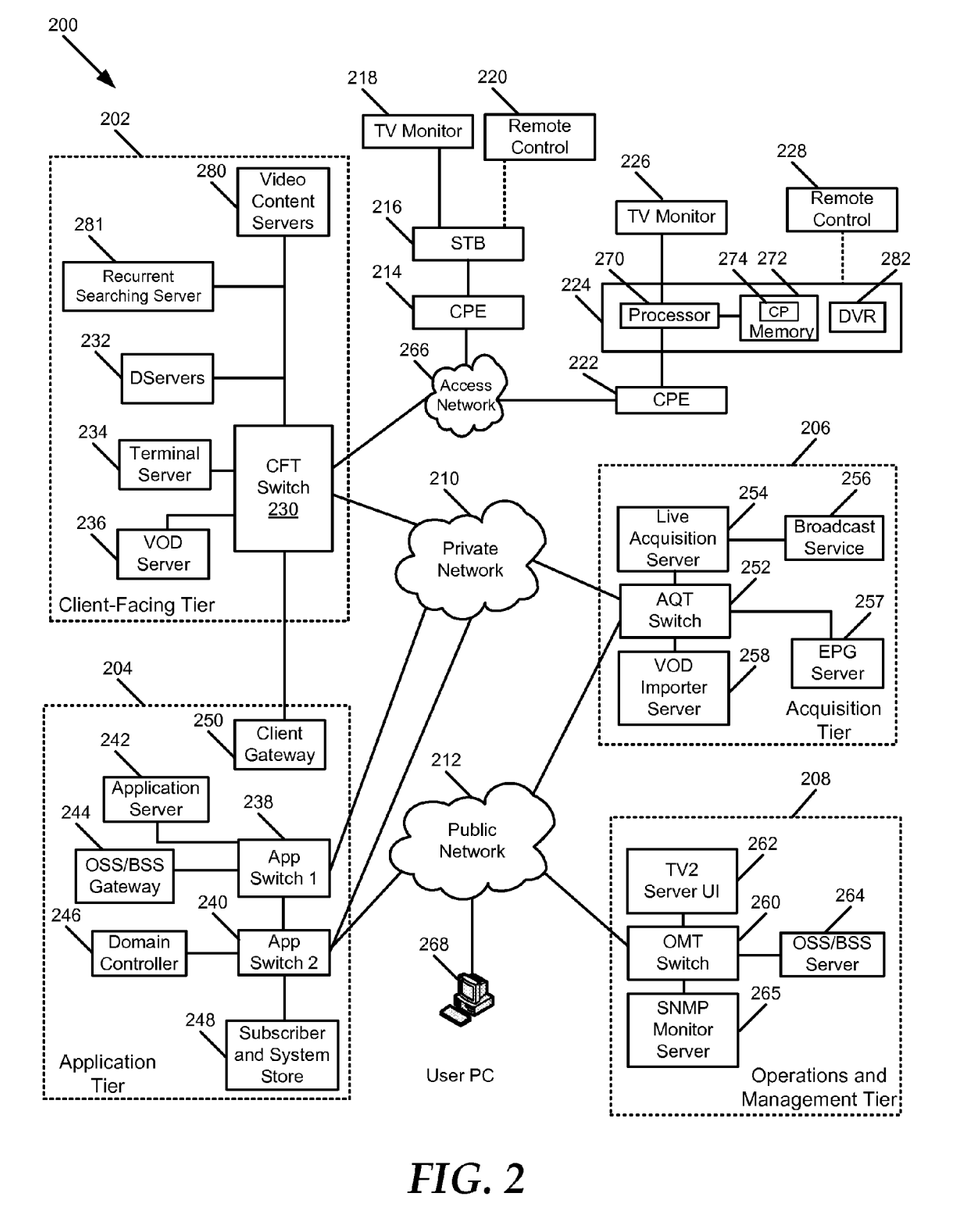
FIG. 2 is a block diagram illustrating a second particular embodiment of a system to record television content.

FIG. 2 illustrates a second particular embodiment of a system 200 to record television content. The system 200 includes elements of an IPTV system having a client facing tier 202, an application tier 204, an acquisition tier 206, and an operations and management tier 208. Each tier 202, 204, 206, and 208 is coupled to a private network 210, a public network 212, or both the private network 210 and the public network 212. For example, the client-facing tier 202 can be coupled to the private network 210, while the application tier 204 can be coupled to the private network 210 and to a public network, such as the Internet. The acquisition tier 206 can also be coupled to the private network 210 and to the public network 212. Moreover, the operations and management tier 208 can be coupled to the public network 212.

The various tiers 202, 204, 206 and 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204 can communicate directly with the client-facing tier 202.

The client-facing tier 202 can communicate with user equipment via a private access network 266, such as an Internet Protocol Television (IPTV) access network. In an illustrative embodiment, customer premises equipment (CPE) such as a first CPE device 214 and a second CPE device 222 can be coupled to the private access network 266. The CPE devices 214 and 222 can include modems (e.g., digital subscriber line modems), residential gateways, routers, other devices, or any combination thereof. The client-facing tier 202 can communicate with a first representative set-top box (STB) device 216 via the first CPE device 214 and with a second representative set-top box device 224 via the second CPE device 222. The client-facing tier 202 can communicate with a large number of set-top boxes over a wide geographic area, such as a regional area, a metropolitan area, a viewing area, or any other suitable geographic area that can be supported by networking the client-facing tier 202 to numerous set-top box devices. In one embodiment, the client-facing tier 202 can be coupled to the CPE devices 214 and 222 via fiber optic cables. Alternatively, the CPE devices 214 and 222 can be digital subscriber line (DSL) modems that are coupled to one or more network nodes via twisted pairs, and the client-facing tier 202 can be coupled to the network nodes via fiber-optic cables. Each of the set-top box devices 216 and 224 can process data received from the private access network 266 via an IPTV software platform such as Microsoft® TV IPTV Edition.

The first set-top box device 216 can be coupled to a first display device 218, such as a first television monitor, and the second set-top box device 224 can be coupled to a second display device 226, such as a second television monitor. Moreover, the first set-top box device 216 can communicate with a first remote control 220, and the second set-top box device 224 can communicate with a second remote control 228. In an exemplary, non-limiting embodiment, each of the set-top box devices 216 and 224 can receive data or video from the client-facing tier 202 via the private access network 266 and render or display the data or video at the display device 218 or 226 to which it is coupled. The set-top box devices 216 and 224 may include tuners that receive and decode television programming information for transmission to the display devices 218 and 226. Further, each of the set-top box devices 216 and 224 can include processing logic and memory accessible to the processing logic, such as the STB processor 270 and the STB memory device 272. Each STB memory device may include one or more computer programs, such as the computer program 274, that are executable by the STB processing logic. In one embodiment, one or more of the set-top box devices 216 and 224 may include integrated digital video recorder (DVR) devices or components, such as the DVR 282. In other embodiments, one or more of the set-top box devices 216 and 224 can be coupled to external DVR devices.

In an illustrative embodiment, the client-facing tier 202 can include a client-facing tier (CFT) switch 230 that manages communication between the client-facing tier 202 and the private access network 266, and between the client-facing tier 202 and the private network 210. As shown, the CFT switch 230 is coupled to one or more distribution servers (D-servers) 232 that may receive and store video content, requests, other data, or any combination thereof, which is bound to and from the set-top box devices 216 and 224. The CFT switch 230 can also be coupled to a terminal server 234 that provides terminal devices with a common connection point to the private network 210. In a particular embodiment, the CFT switch 230 can also be coupled to a video-on-demand (VOD) server 236.

The CFT switch 230 is also coupled to a plurality of video servers 280 that store video content that is to be distributed via the access network 266 to the set-top box devices 216 and 224. In an illustrative, non-limiting embodiment, each of the video servers 280 can be associated with one or more channels. In addition, the CFT switch 230 can be coupled to one or more recurrent searching servers 281 that are adapted to search EPG data and to instruct each set-top box device to record television programs that satisfy television program search criteria associated with the set-top box device). In another embodiment, the recurrent searching server(s) 281 are adapted to store television program search criteria associated with a set-top box device and to recurrently command the set-top box device to search EPG data based on the stored television program search criteria.

The application tier 204 communicates with both the private network 210 and the public network 212. In this embodiment, the application tier 204 can include a first application tier (APP) switch 238 and a second APP switch 240. The first APP switch 238 can be coupled to the second APP switch 240. The first APP switch 238 can be coupled to an application server 242 and to an OSS/BSS gateway 244. The application server 242 provides applications to the set-top box devices 216 and 224 via the private access network 266. Such applications enable the set-top box devices 216 and 224 to provide functions such as display, messaging, processing of IPTV data and VOD material, gaming functions, other functions, or any combination thereof. In a particular embodiment, the OSS/BSS gateway 244 includes operation systems and support (OSS) data, as well as billing systems and support (BSS) data.

The second APP switch 240 is coupled to a domain controller 246 that is adapted to provide web access, for example, to subscribers via the public network 212. In addition, the second APP switch 240 is coupled to a subscriber and system store 248 that includes account information, such as account information that is associated with users who access the system 200 via the private network 210 or the public network 212. In a particular embodiment, the application tier 204 can also include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto.

In a particular embodiment, the set-top box devices 216 and 224 can access the system via the private access network 266 using information received from the client gateway 250. The private access network 266 provides security for the private network 210. User devices can access the client gateway 250 via the private access network 266, and the client gateway 250 can allow such devices to access the private network 210 once the devices are authenticated or verified. Similarly, the client gateway 250 can prevent unauthorized devices, such as hacker computers or stolen set-top box devices, from accessing the private network 210 by denying access to these devices beyond the private access network 266.

For example, when the set-top box device 216 accesses the system 200 via the private access network 266, the client gateway 250 can verify subscriber information by communicating with the subscriber and system store 248 via the private network 210, the first APP switch 238 and the second APP switch 240. Further, the client gateway 250 can verify billing information and status by communicating with the OSS/BSS gateway 244 via the private network 210 and the first APP switch 238. The OSS/BSS gateway 244 can transmit a query across the first APP switch 238, to the second APP switch 240, and the second APP switch 240 can communicate the query across the public network 212 to the OSS/BSS server 264. After the client gateway 250 confirms subscriber and/or billing information, the client gateway 250 can allow the set-top box device 216 access to IPTV content and VOD content. If the client gateway 250 cannot verify subscriber information for the set-top box device 216, (e.g., it is connected to a different twisted pair), the client gateway 250 can deny transmissions to and from the set-top box device 216 beyond the private access network 266.

The acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives television content, for example, from a broadcast service 256. Further, the AQT switch 252 can be coupled to a video-on-demand importer server 258 that stores television content received at the acquisition tier 206 and communicates the stored content to the client-facing tier 202 via the private network 210. In addition, the AQT switch 252 can be coupled to an electronic program guide (EPG) server 257 that is adapted to receive television program information from the live acquisition server 254, the broadcast service 256, the VOD importer server 258, other television program information sources, or any combination thereof. The EPG server 257 is adapted to process such information and to generate electronic program guide data, based on the information. The electronic program guide data can include, for example, an electronic program guide generated at the EPG server 257 or television program information that can be used to generate an electronic program guide.

The operations and management tier 208 can include an operations and management tier (OMT) switch 260 that conducts communication between the operations and management tier 208 and the public network 212. In the illustrated embodiment, the OMT switch 260 is coupled to a TV2 server 262 that is adapted to provide a TV2 user interface to user computers 268 via the public network 212, for example. Additionally, the OMT switch 260 can be coupled to an OSS/BSS server 264 and to a simple network management protocol (SNMP) monitor 265 that monitors network devices. In a particular embodiment, the OMT switch 260 can communicate with the AQT switch 252 via the public network 212.

In an illustrative embodiment, each set-top box device is adapted to receive input from a user specifying one or more television program search criteria, such as a keyword, an actor name, a subject, a time, a date, other television program search criteria, or any combination thereof. Each set-top box device is adapted to send the one or more television program search criteria to the recurrent searching server 281 via the access network 266. The recurrent searching server 281 is adapted to receive the one or more television program search criteria from each set-top box device and to store the one or more television program search criteria in association with the set-top box device from which it is received.

In a particular embodiment, the recurrent searching server 281 is adapted to recurrently search EPG data stored at the recurrent searching server 281, the EPG server 257, or a combination thereof, based on the one or more television program search criteria associated with the set-top box device 224. For example, the recurrent searching server 281 can be adapted to search EPG data that is accessible to the recurrent searching server 281 when data corresponding to the television program search criteria is received from the set-top box device 224. Moreover, the recurrent searching server 281 can be adapted to perform at least one additional search of EPG data that is accessible to the recurrent searching server 281 at the end of one or more recurrent searching periods, when new EPG data is accessible to the recurrent searching server 281, or any combination thereof.

The recurrent searching server 281 can be adapted to search EPG data in a variety of ways. In one example, the recurrent searching server 281 can receive and store EPG data sent by the EPG server 257, and the recurrent searching server 281 can be adapted to search EPG data stored at the recurrent searching server 281. Alternatively, the recurrent searching server 281 can be adapted to submit one or more search queries to the EPG data server 257 requesting EPG data corresponding to one or more television programs that match or otherwise satisfy television program search criteria associated with the set-top box device 224.

Further, the recurrent searching server 281 can be adapted to determine whether EPG data indicates that one or more television programs match or otherwise satisfy the television program search criteria associated with the set-top box device 224. The recurrent searching server 281 is adapted to instruct the set-top box device 224 to record the matching television program(s), or to instruct the set-top box device 224 to cause the DVR 282 to record the matching television program(s). The set-top box device 224 is adapted to record the one or more television programs or to instruct the DVR to record the one or more television programs, in response to related instructions received from the recurrent searching server 281. In another embodiment, the set-top box device 224 can output program recommendations that include the one or more matching television programs via the television monitor 226.

In another particular embodiment, the recurrent searching server 281 can be adapted to recurrently instruct the set-top box device 224 to search EPG data stored at the set-top box device 224, at the EPG server 257, or a combination thereof. For instance, the recurrent searching server 281 can be adapted to send data to the set-top box device 224 corresponding to a command to search EPG data that is accessible to the set-top box device 224 when television program search criteria are received from the set-top box device 224, when a searching recurrent searching period has ended, when the recurrent searching server 281 receives data indicating that new EPG data is accessible to the set-top box device 224, or a combination thereof. The recurrent searching server 281 is also adapted to send one or more stored television program search criteria associated with the set-top box device 224 with each command to perform a search of EPG data based on the one or more television program search criteria. The set-top box device 224 can be adapted to determine whether the EPG data indicates that any television programs match or otherwise satisfy the television program search criteria and to record such television programs, to cause the DVR 282 to record such television programs, to output program recommendations that include such television programs at the television monitor 228, or any combination thereof.

In addition, the recurrent searching server 281 can be adapted to change the one or more television program search criteria in response to a request received from the set-top box device 224. For example, the set-top box device 224 can receive input from a user indicating that the one or more television program search criteria are to be changed and specifying new television program search criteria. The recurrent searching server 281 can be adapted to receive data corresponding to new television program search criteria from the set-top box device 224. The recurrent searching server 281 can also be adapted to perform recurrent searches of EPG data based on the new television program search criteria and to instruct the set-top box device 224 to cause television programs satisfying the television program search criteria to be recorded. Alternatively, the recurrent searching server 281 can be adapted to send data corresponding to the new television program search criteria to the set-top box device 224 with recurrent commands for the set-top box device 224 to perform a search of EPG data. Further, the recurrent searching server 281 is adapted to delete television program search criteria in response to a request received from the set-top box device 224, such as a request to delete such television program search criteria or a request to discontinue recurrent searching based on the television program search criteria.

Figure 3:
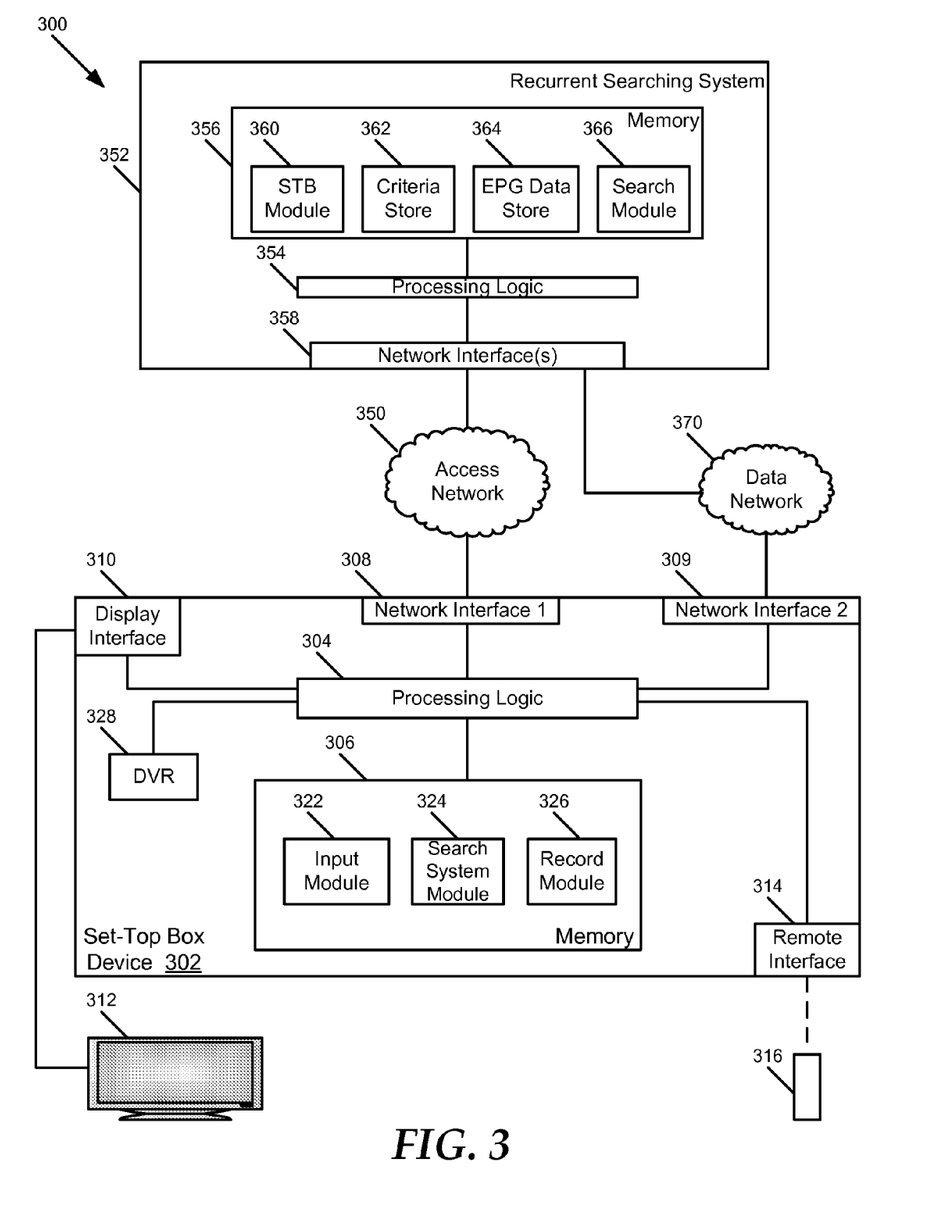
FIG. 3 is a block diagram illustrating a third particular embodiment of a system to record television content.

FIG. 3 illustrates a third particular embodiment of a system 300 to record television content. The system 300 includes a set-top box device 302 that communicates with a recurrent searching system 352 via a television service provider access network 350, such as a cable network, a satellite television network or an Internet Protocol Television network. The recurrent searching system 352 can include one or more servers, switches, databases, other network elements, or any combination thereof. In other embodiments, the recurrent searching system 352 can be incorporated with another system or network element. For example, the recurrent searching system 352, or elements thereof, can be incorporated with a video server, distribution server or other network element of a television service provider.

In a particular embodiment, the set-top box device 302 can also communicate with the recurrent searching system 352 via a data network 370, such as the Internet or a private broadband data network. For example, when the access network 350 does not facilitate upstream communication from the set-top box device 302, the set-top box device 302 can communicate with television service provider systems, such as the recurrent searching system 352 and other systems, via the data network 370.

The set-top box device 302 includes processing logic 304 and memory 306 accessible to the processing logic 304. The set-top box device 302 also includes a first network interface 308 that is adapted to facilitate communication between the set-top box device 302 and the access network 350. Further, the set-top box device 302 can include a second network interface 309 that is adapted to facilitate communication between the set-top box device 302 and the data network 370. In addition, the set-top box device 302 includes a display interface 310 adapted to facilitate communication between the set-top box device 302 and a display device, such as the television 312. The set-top box device 302 also includes a remote interface 314 that is adapted to communicate with a remote control device 316. In one embodiment, the set-top box device 302 can include an integrated digital video recorder (DVR) 328.

In a particular embodiment, the memory 306 includes a plurality of modules 322-326. The modules 322-326 can include computer instructions that are readable and executable by the processing logic 304 to implement various functions of the set-top box device 302 with respect to recording television content. For example, the modules 322-326 can represent various aspects of one or more software applications, operating systems, or other computer programs. In other embodiments, the modules 322-326 can be implemented as hardware logic or a combination of hardware logic and computer instructions.

The memory 306 includes an input module 322 that is executable by the processing logic 304 to receive and process input from a user. For instance, the input module 322 is executable by the processing logic 304 to receive input corresponding to a television program search function, such as input requesting recurrent searching and specifying one or more television program search criteria. In another example, the input module 322 is executable by the processing logic 304 to receive input specifying one or more changes in television program search criteria, input indicating a request to discontinue recurrent searching, input indicating that television program search criteria is to be deleted, or any combination thereof.

The memory 306 also includes a search system module 324 that is executable by the processing logic 304 to send data to, and receive data from, the recurrent searching system 352. For example, the search system module 324 is executable by the processing logic 304 to send data to the recurrent searching system 352 indicating a recurrent searching request, specifying one or more television program search criteria, or a combination thereof. In another example, the search system module 324 is executable by the processing logic 304 to send data to the recurrent searching system 352 specifying one or more changes in television program search criteria, indicating that television program search criteria are to be deleted, requesting that recurrent searching be discontinued, or any combination thereof.

In a particular embodiment, the search system module 324 can be executable by the processing logic 304 to send data to, and receive data from, the recurrent searching system 352 via the access network 350. In another embodiment, the search system module 324 can be executable by the processing logic 304 to send data to the recurrent searching system 352 via the data network 370 and to receive data from the recurrent searching system 352 via the access network 350, the data network 370, or a combination thereof.

Further, the search system module 324 is executable by the processing logic 304 to receive data from the recurrent searching system 352 indicating that the set-top box device 302 is to record one or more television programs at the digital video recorder (DVR) 328. The memory 306 includes a record module 326 that is executable by the processing logic 304 to record the television program(s) at the DVR 328 or to instruct an external DVR to record the television program(s). In one embodiment, the record module 326 can be executable by the processing logic 304 to send television program recommendations that include the television program(s) indicated by the recurrent searching system 352 at the display device 312 and to record one or more television programs selected by a user from the recommendations or cause the selected television program(s) to be recorded.

The recurrent searching system 352 includes processing logic 354 and memory 356 accessible to the processing logic 354. The recurrent searching system 352 also includes at least one network interface 358 that is adapted to facilitate communication between the recurrent searching system 352 and the access network 350, the data network 370, or a combination thereof. In a particular embodiment, the memory 356 includes a plurality of modules 360-366. The modules 360-366 can include computer instructions that are readable and executable by the processing logic 354 to implement various functions of the recurrent searching system 352 with respect to recording television content. For example, the modules 360-366 can represent various aspects of one or more software applications, operating systems, or other computer programs. In other embodiments, the modules 360-366 can be implemented as hardware logic or a combination of hardware logic and computer instructions.

The memory 356 includes a set-top box module 360 that is executable by the processing logic 354 to receive data from the set-top box device 302 via the access network 350, via the data network 370, or a combination thereof. For example, the set-top box module 360 is executable by the processing logic 354 to receive data corresponding to a recurrent search request, data specifying television program search criteria, or a combination thereof, from the set-top box device 302. Further, the set-top box module 360 is executable by the processing logic 354 to receive data from the set-top box device 302 data specifying changes in television program search criteria, requests to discontinue recurrent searching, requests to delete television program search criteria, or any combination thereof. In addition, the set-top box module 360 is executable by the processing logic 354 to send data to the set-top box device 302 identifying television programs satisfying the television program search criteria and instructing the set-top box device 302 to record the television programs, to cause the television programs to be recorded, to output recommendations including the television programs, or any combination thereof.

The memory 356 includes a criteria module 362 to store television program search criteria received from the set-top box device 302. The criteria module 362 is also executable by the processing logic 354 to change and delete television program search criteria associated with the set-top box device 302, in response to related requests received from the set-top box device 302. In addition, the memory 356 includes an electronic program guide (EPG) data store 364 to store EPG data received at the recurrent searching system 352 from an EPG data server or other source of television programming information.

Further, the memory 356 includes a search module 366 that is executable by the processing logic 354 to recurrently search EPG data based on television program search criteria received from the set-top box device 302. The search module 366 is executable by the processing logic 354 to search the EPG data periodically, when the EPG data is updated or otherwise changed at the EPG data store 364, when television program search criteria are received, when television program search criteria are changed, when other times or events occur, or any combination thereof. Further, the search module 366 is executable by the processing logic 354 to determine whether the EPG data indicates that one or more television programs match or otherwise satisfy the television program search criteria. In one embodiment, the search module 366 can be executable by the processing logic 354 to instruct the set-top box device 302 to record one or more television programs that match or otherwise satisfy the television program search criteria associated with the set-top box device 302 at the DVR 328. In another embodiment, the search module 366 can be executable by the processing logic 354 to instruct the set-top box device 302 to output recommendations that include the one or more television programs.

Figure 4:
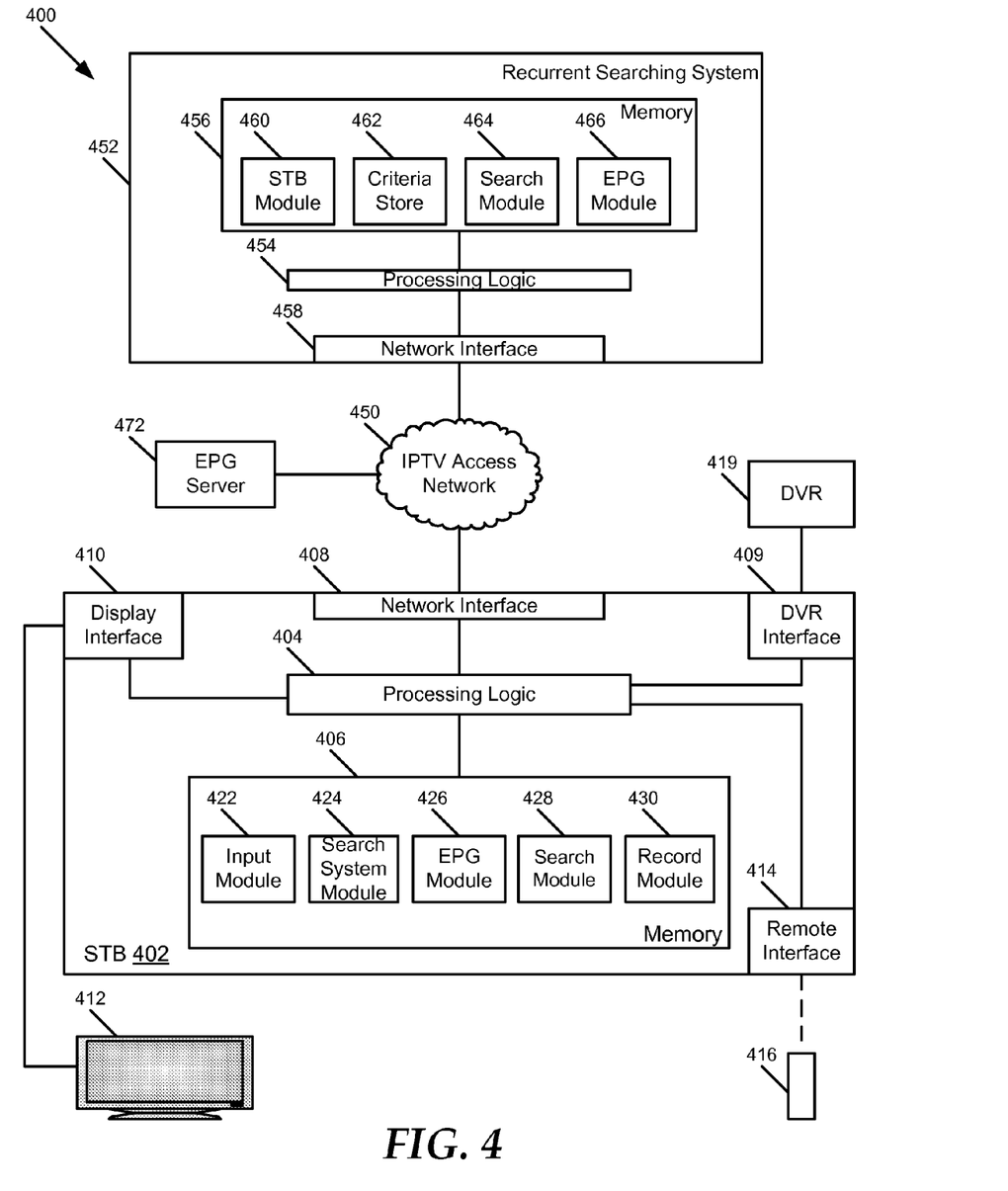
FIG. 4 is a block diagram illustrating a fourth particular embodiment of a system to record television content.

FIG. 4 illustrates a fourth particular embodiment of a system 400 to record television content. The system 400 includes a set-top box device 402 that communicates with a recurrent searching system 452 via an Internet Protocol Television (IPTV) access network 450. The set-top box device 402 also communicates with an electronic program guide (EPG) server 472 via the IPTV access network 450. The set-top box device 402 includes processing logic 404 and memory 406 accessible to the processing logic 404. The set-top box device 402 also includes a network interface 408 that is adapted to facilitate communication between the set-top box device 402 and the IPTV access network 450. In addition, the set-top box device 402 includes a display interface 410 adapted to facilitate communication between the set-top box device 402 and a display device, such as the television 412. The set-top box device 402 also includes a remote interface 414 that is adapted to communicate with a remote control device 416. In one embodiment, the set-top box device 402 includes a digital video recorder (DVR) interface 409 that is adapted to facilitate communication between the set-top box device 402 and an external DVR 419.

In a particular embodiment, the memory 406 includes a plurality of modules 422-430. The modules 422-430 can include computer instructions that are readable and executable by the processing logic 404 to implement various functions of the set-top box device 402 with respect to recording television content. For example, the modules 422-430 can represent various aspects of one or more software applications, operating systems, or other computer programs. In other embodiments, the modules 422-430 can be implemented as hardware logic or a combination of hardware logic and computer instructions.

The memory 406 includes an input module 422 that is executable by the processing logic 404 to receive and process input from a user. For instance, the input module 422 is executable by the processing logic 404 to receive input corresponding to a television program search function, such as input requesting recurrent searching and specifying one or more television program search criteria. In another example, the input module 422 is executable by the processing logic 404 to receive input specifying one or more changes in television program search criteria, input indicating a request to discontinue recurrent searching, input indicating that television program search criteria are to be deleted, or any combination thereof.

The memory 406 also includes a search system module 424 that is executable by the processing logic 404 to send data to, and receive data from, the recurrent searching system 452 via the IPTV access network 450. For example, the search system module 424 is executable by the processing logic 404 to send data to the recurrent searching system 452 specifying one or more television program search criteria. In another example, the search system module 424 is executable by the processing logic 404 to send data to the recurrent searching system 452 specifying one or more changes in television program search criteria, indicating that television program search criteria are to be deleted, or any combination thereof.

In a particular embodiment, the memory 406 includes an EPG module 426 that is executable by the processing logic 404 to receive and store EPG data sent by the EPG server 472 on a periodic basis, whenever new EPG data is accessible to the set-top box device 402, when other times or events occur, or any combination thereof. In one example, the EPG module 426 can be executable by the processing logic 404 to receive data corresponding to an electronic program guide from the EPG server 472. In another example, the EPG module 426 can be executable by the processing logic 404 to receive data corresponding to television programming content and to generate an electronic program guide based on the data.

The memory 406 includes a search module 428 that is executable by the processing logic 404 to receive data from the recurrent searching system 452 corresponding to recurrent commands to search EPG data and corresponding to television program search criteria associated with the set-top box device 402. The search module 428 is executable by the processing logic 404 to search, in response to such commands, EPG data stored at the set-top box device 402, at the EPG server 472, or a combination thereof, based on the television program search criteria received from the recurrent searching system 452. Further, the search module 428 is executable by the processing logic 404 to determine whether the EPG data indicates that one or more television programs match or otherwise satisfy the television program search criteria. The memory 406 includes a record module 430 that is executable by the processing logic 404 to instruct the DVR 419 to record one or more television programs that match or otherwise satisfy the television program search criteria.

In another embodiment, the search module 428 can be executable by the processing logic 404 to output recommendations that include the one or more television programs at the display device 412. The search module 430 can be executable by the processing logic 404 to receive user selections from the recommendations and to instruct the DVR 419 to record the selected television program(s).

The recurrent searching system 452 includes processing logic 454 and memory 456 accessible to the processing logic 454. The recurrent searching system 452 also includes a network interface 458 that is adapted to facilitate communication between the recurrent searching system 452 and the access network 450. In a particular embodiment, the memory 456 includes a plurality of modules 460-466. The modules 460-466 can include computer instructions that are readable and executable by the processing logic 454 to implement various functions of the recurrent searching system 452 with respect to recording television content. For example, the modules 460-466 can represent various aspects of one or more software applications, operating systems, or other computer programs. In other embodiments, the modules 460-466 can be implemented as hardware logic or a combination of hardware logic and computer instructions.

The memory 456 includes a set-top box module 460 that is executable by the processing logic 454 to send data to, and receive data from, the set-top box device 402 via the access network 450. For example, the set-top box module 460 is executable by the processing logic 454 to receive data specifying television program search criteria from the set-top box device 402. Further, the set-top box module 460 is executable by the processing logic 454 to receive data from the set-top box device 402 corresponding to changes in television program search criteria, requests to delete television program search criteria, or a combination thereof. The memory 456 also includes a criteria module 462 to store television program search criteria received from the set-top box device 402. The criteria module 462 is also executable by the processing logic 454 to change and delete television program search criteria associated with the set-top box device 402, in response to related requests from the set-top box device 402.

In addition, the memory 456 includes a search module 464 that is executable by the processing logic 454 to recurrently send data to the set-top box device 402 corresponding to a command to perform an EPG data search based on the television program search criteria. The data can also indicate television program search criteria associated with the set-top box device. The search module 464 can be executable by the processing logic 454 to send such data to the set-top box device 402 periodically, when EPG data is updated at the set-top box device 402, when EPG data is updated at the EPG server 472, when television program search criteria are received at the recurrent searching system 452, when modifications of television program search criteria are received at the recurrent searching system 452, or any combination thereof. In an illustrative embodiment, the memory 456 can include an EPG module 466 that is executable by the processing logic 454 to receive data from the EPG server 472 indicating that new EPG data is accessible to the set-top box device at the EPG server 472, has been sent to the set-top box device by the EPG server 472, or a combination thereof.

Figure 5:
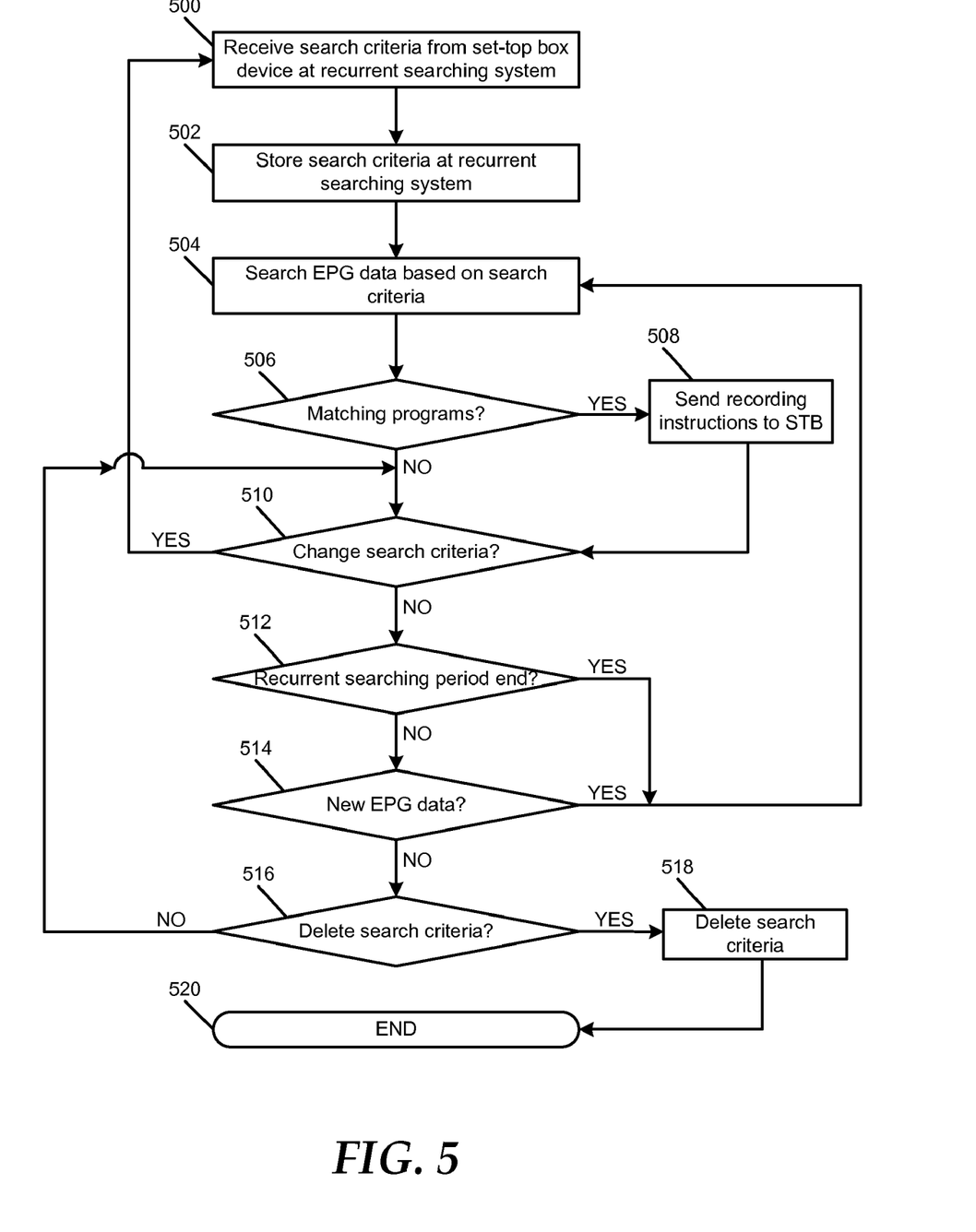
FIG. 5 is a flow diagram illustrating a particular embodiment of a method of recording television content.

FIG. 5 illustrates a particular embodiment of a method of recording television content. At block 500, a recurrent searching system receives one or more television program search criteria from a set-top box device. Moving to block 502, the recurrent searching system stores the television program search criteria. Proceeding to block 504, the recurrent searching system searches electronic program guide (EPG) data accessible to the recurrent searching system based on the received television program search criteria.

Continuing to decision node 506, the recurrent searching system determines whether the EPG data indicates that one or more television programs that match or otherwise satisfy the television program search criteria. If the recurrent searching system determines that there are not any television programs that match or otherwise satisfy the television program search criteria, the method advances to decision node 510. Conversely, if the recurrent searching system determines that there are one or more television programs match or otherwise satisfy the television program search criteria, the method advances to block 508, and the recurrent searching system sends instructions to the set-top box device to record the one or more matching television programs or to cause the one or more matching television programs to be recorded at a device coupled to the set-top box device. The method then continues to decision node 510.

At decision node 510, the recurrent searching system determines whether it has received a request to change the television program search criteria. If the recurrent searching system has received a request to change the television program search criteria, the method returns to block 500. Whereas, if the recurrent searching system has not received a request to change the television program search criteria, the method moves to decision node 512, and the recurrent searching system determines whether a recurrent searching period has ended. If the recurrent searching system determines that a recurrent searching period has ended, the method returns to 504, and the recurrent searching system performs another search of EPG data that is accessible to the recurrent searching system. If the recurrent searching system determines that a recurrent searching period has not ended, the method can proceed to decision node 514, and the recurrent searching system can determine whether it has received an indication that there is new EPG data accessible to the recurrent searching system. If there is new EPG data accessible to the recurrent searching system, the method can return to block 504, and the recurrent searching system can perform another search of the EPG data that is accessible to the recurrent searching system, including new EPG data, previous EPG data, or a combination thereof.

Returning to decision node 514, in a particular embodiment, if the recurrent searching system has not received an indication that there is new EPG data accessible to the recurrent searching system, the method can continue to decision node 516, and the recurrent searching system can determine whether it has received a request to delete the television program search criteria. If the recurrent searching system has not received a request to delete the television program search criteria, the method returns to decision node 510. Conversely, if the recurrent searching system has received a request to delete the television program search criteria, the method advances to block 518, and the recurrent searching system deletes the television program search criteria. The method terminates at 520.

Figure 6:
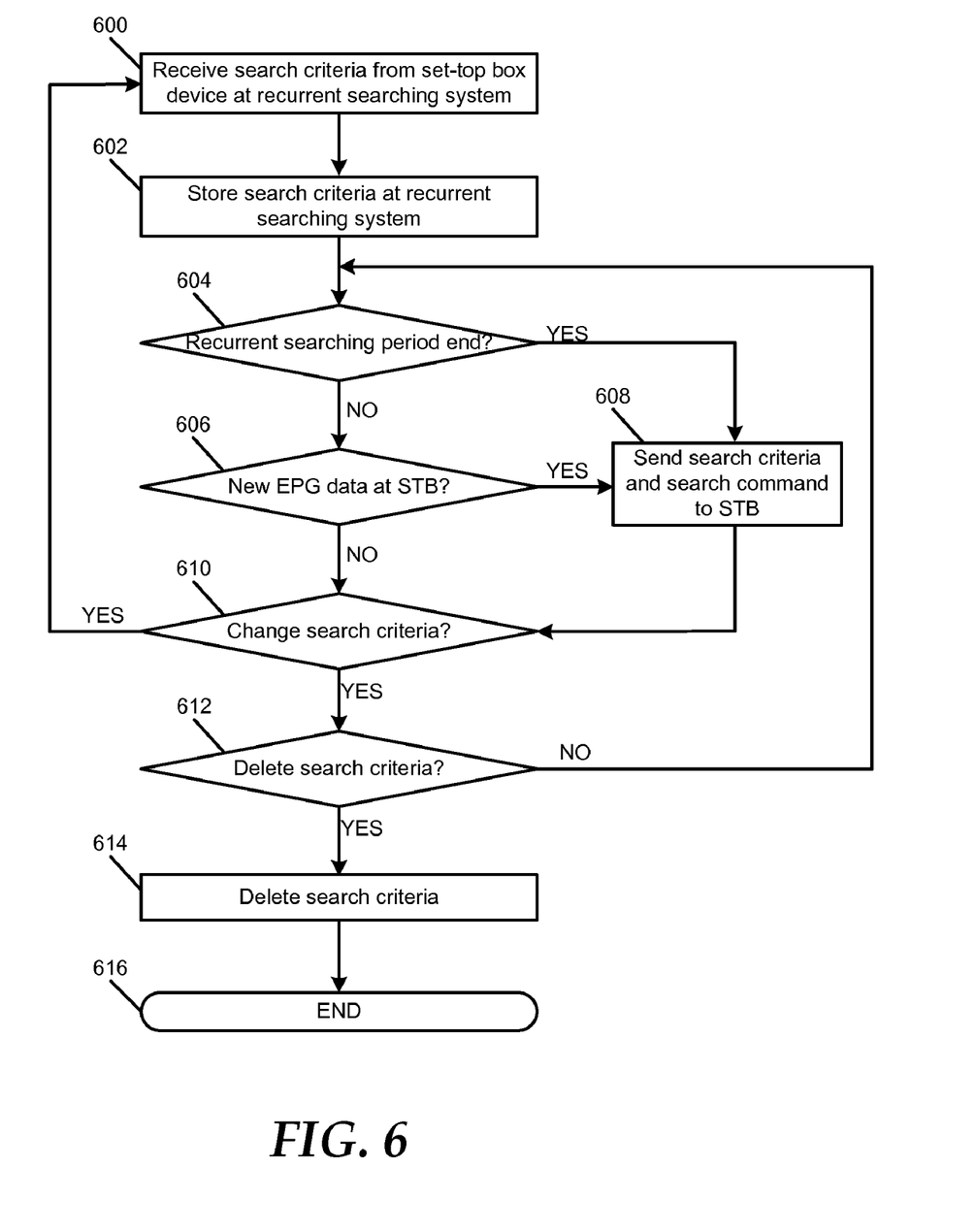
FIG. 6 is a flow diagram illustrating a second particular embodiment of a method of recording television content.

FIG. 6 illustrates a second particular embodiment of a method of recording television content. At block 600, a recurrent searching system receives one or more television program search criteria from a set-top box device. Moving to block 602, the recurrent searching system stores the television program search criteria. Proceeding to decision node 604, the recurrent searching system whether a recurrent searching period has ended. If the recurrent searching system determines that a recurrent searching period has ended, the method advances to block 608, and the recurrent searching system sends the stored television program search criteria and a command to search electronic program guide (EPG) data to the set-top box device. The method then moves to decision node 610.

Returning to decision node 604, if the recurrent searching system determines that a recurrent searching period has not ended, the method proceeds to decision node 606, and the recurrent searching system determines whether it has received an indication that there is new EPG data (e.g., updated EPG data) has been sent to the set-top box device or is otherwise accessible to the set-top box device. If the recurrent searching system receives an indication of new EPG data, the method proceeds to block 608. Whereas, if the recurrent searching system has not received an indication of new EPG data, the method continues to decision node 610, and the recurrent searching system can determine whether it has received a request to change the television program search criteria.

If the recurrent searching system has received a request to change the television program search criteria, the method returns to block 600. Whereas, if the recurrent searching system has not received a request to change the television program search criteria, the method moves to decision node 612, and the recurrent searching system can determine whether it has received a request to delete the television program search criteria. If the recurrent searching system has not received a request to delete the television program search criteria, the method returns to decision node 604. Conversely, if the recurrent searching system has received a request to delete the television program search criteria, the method advances to block 614, and the recurrent searching system deletes the television program search criteria. The method terminates at 616.

Figure 7:
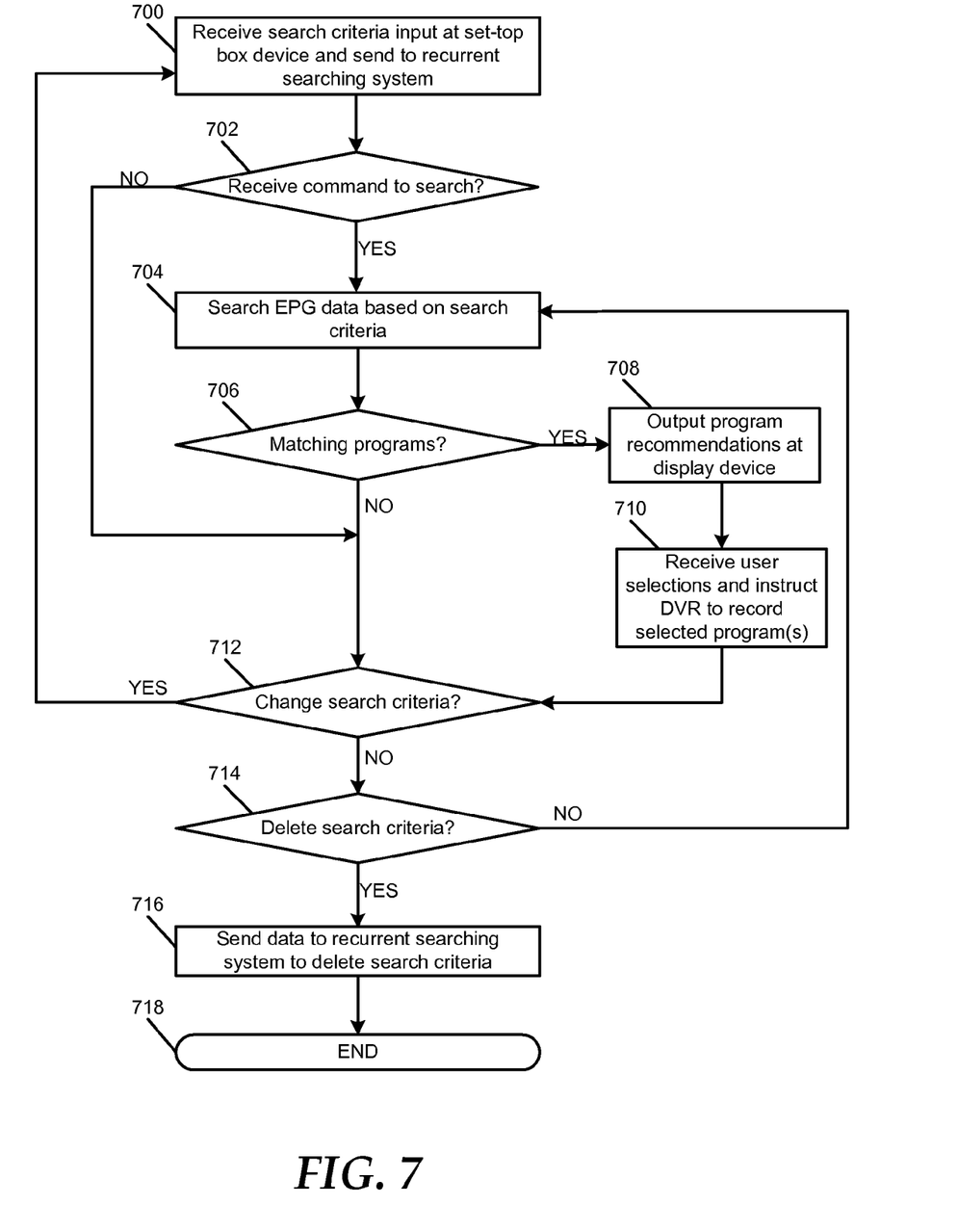
FIG. 7 is a flow diagram illustrating a third particular embodiment of a method of recording television content.

FIG. 7 illustrates a third particular embodiment of a method of recording television content. At block 700, a set-top box device receives inputs corresponding to one or more television program search criteria. The set-top box device sends the one or more television program search criteria to a recurrent searching system at a video head-end associated with a television service provider via an Internet Protocol (IP) network, such as an Internet Protocol Television (IPTV) access network or a data network. Proceeding to decision node 702, the set-top box device determines whether it has received a command to search EPG data that is stored at the set-top box device or is otherwise accessible to the set-top box device.

If the set-top box device does not receive a command to search EPG data, the method advances to decision node 712. Conversely, if the set-top box device receives a command to search EPG data accessible to the set-top box device, the method continues to block 704, and the set-top box device searches the EPG data. Moving to block 706, the set-top box device determines whether the EPG data indicates that one or more television programs match or otherwise satisfy the television program search criteria. If the set-top box device determines that there are not any television programs that satisfy the television program search criteria, the method proceeds to decision node 712. Conversely, if the set-top box device determines that there are one or more television programs match or otherwise satisfy the television program search criteria, the method advances to block 708, and the set-top box device outputs program recommendations that include the one or more matching television programs at a display device that is coupled to the set-top box device. Continuing to block 710, the set-top box device receives one or more user selections from the program recommendations and instructs a DVR device to record the selected programs. The method then proceeds to decision node 712.

At decision node 712, the set-top box device determines whether it has received a request to change the television program search criteria. If the set-top box device has received a request to change the television program search criteria, the method returns to block 700. Whereas, if the set-top box device has not received a request to change the television program search criteria, the method moves to decision node 714, and the set-top box device can determine whether it has received a request to delete the television program search criteria. If the set-top box device has not received a request to delete the television program search criteria, the method returns to decision node 704. Conversely, if the set-top box device has received a request to delete the television program search criteria, the method advances to block 716, and the set-top box device sends data to the recurrent searching system indicating that the television program search criteria is to be deleted. The method terminates at 718.

Figure 8:
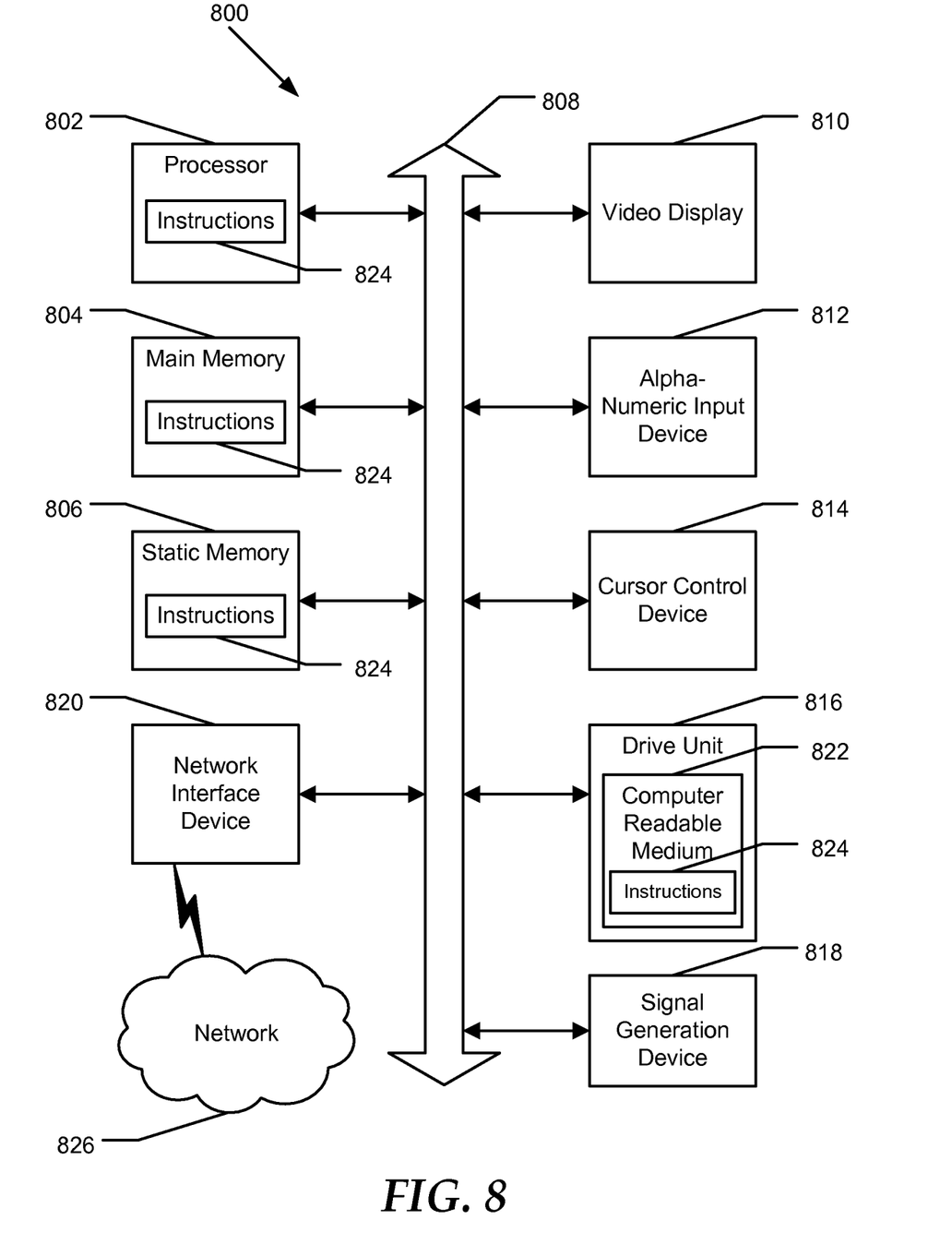
FIG. 8 is a block diagram illustrating a particular embodiment of a general computer system.

FIG. 8 shows an illustrative embodiment of a general computer 800 including a set of instructions that can be executed to cause the computer system to perform any one or more of the methods or computer based functions disclosed herein. The computer system 800 may operate as a standalone device or may be connected, e.g., using a network, to other computer systems or peripheral devices. In an illustrative embodiment, such standalone and peripheral devices can include, for example, set-top box devices, recurrent searching systems, other network elements, other subscriber devices, or any combination thereof, as illustrated in FIGS. 1-4.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of recording television content, the method comprising:
    receiving one or more television program search criteria from a set-top box device at a recurrent searching system;
    storing the one or more television program search criteria at the recurrent searching system;
    performing at the recurrent searching system a first search of first electronic program guide (EPG) data accessible to the recurrent searching system based on the one or more television program search criteria;
    performing at least one additional search of the first EPG data accessible to the recurrent searching system based on the one or more television program search criteria after the first search, wherein the at least one additional search is performed when a match is found and when a match is not found in response to a lapse of a pre-determined time period and is not performed in response to an update to the first EPG data, and wherein the first EPG data is updated based on scheduling of television programs; and
    instructing the set-top box device to perform a second search of second EPG data stored at the set-top box.

2. The method of claim 1, further comprising determining from the first search, the at least one additional search, the second search or a combination thereof, whether the first or second EPG data indicates that at least one television program satisfies the one or more television program search criteria.

3. The method of claim 2, further comprising instructing the set-top box device to record the at least one television program or to cause the at least one television program to be recorded.

4. A method of recording television content, the method comprising:
    receiving one or more television program search criteria from a set-top box device at a recurrent searching system;
    storing the one or more television program search criteria at the recurrent searching system;
    sending data from the recurrent searching system to the set-top box device corresponding to the one or more television program search criteria and corresponding to a command for the set-top box device to perform a first search of first electronic program guide (EPG) data accessible to the set-top box device based on the one or more television program search criteria;
    sending additional data to the set-top box device corresponding to the one or more television program search criteria and corresponding to at least one additional command for the set-top box device to perform at least one additional search of the first EPG data accessible to the set-top box device based on the one or more television program search criteria, wherein the at least one additional search is performed when a match is found and when a match is not found in response to a lapse of a pre-determined time period and is not performed in response to an update to the first EPG data, and wherein the first EPG data is updated based on scheduling of television programs; and
    performing at the recurrent searching system a second search of second EPG data stored at the recurrent searching system based on the one or more television program search criteria.

5. A system to record television content, the system comprising:
    an interface device to receive one or more television program search criteria from a set-top box device via a network;
    a criteria store to store the one or more television program search criteria;
    processing logic and a memory device accessible to the processing logic, wherein the memory device includes instructions executable by the processing logic to:
    recurrently search first electronic program guide (EPG) data accessible to the system, based on the one or more television program search criteria; and send data to the set-top box device indicating at least one television program satisfying the one or more television program search criteria; and provide instructions to the set-top box device to perform a second search of second EPG data stored at the set-top box, wherein the second search is performed when a match is found and when a match is not found in response to a lapse of a pre-determined time period and is not performed in response to an update of the second EPG data.

6. The system of claim 5, wherein the data indicating the at least one television program includes an instruction to record the at least one television program, an instruction to cause the at least one television program to be recorded, an instruction to output recommendations including the at least one television program, or any combination thereof.

7. The system of claim 5, wherein the interface device comprises a data network interface device.

8. The system of claim 5, wherein the interface device comprises a television service provider access network interface device.

9. The system of claim 5, wherein the first EPG data is stored at the memory.

10. The system of claim 5, wherein the first EPG data is stored at an EPG data server and wherein the memory device includes instructions executable by the processing logic to query the EPG data server for the first EPG data related to television programs satisfying the one or more television program search criteria.

11. A set-top box device, comprising:
processing logic and memory accessible to the processing logic, wherein the memory includes instructions executable by the processing logic to:
receive input specifying one or more television program search criteria;
send data corresponding to the one or more television program search criteria to a recurrent searching system via a network;
receive data from the recurrent searching system corresponding to the one or more television program search criteria and corresponding to a command for the set-top box device to perform a first search of first electronic program guide (EPG) data accessible to the set-top box device based on the one or more television program search criteria; and
receive additional data from the recurrent searching system corresponding to the one or more television program search criteria and corresponding to at least one additional command for the set-top box device to perform an additional search of EPG data accessible to the set-top box device based on the one or more television program search criteria, wherein the at least one additional search is performed when a match is found and when a match is not found in response to a lapse of a pre-determined time period and is not performed in response to an update to the EPG data, and wherein the first EPG data is updated based on scheduling of television programs, and wherein the recurrent searching system performs a second search of second EPG data stored at the recurrent searching system based on the one or more television program search criteria.

12. The set-top box device of claim 11, further comprising searching EPG data accessible to the set-top box device in response to the command to perform the first search and in response to each additional command.

13. The set-top box device of claim 12, wherein the memory includes instructions executable by the processing logic to determine from the first search, the at least one additional search, or a combination thereof, whether the EPG data indicates that at least one television program satisfies the one or more television program search criteria.

14. The set-top box device of claim 13, wherein the memory includes instructions executable by the processing logic to record a television program or to instruct a digital video recorder (DVR) coupled to the set-top box device to record a television program when the first or second EPG data indicates that the television program satisfies the one or more television program search criteria.

15. The set-top box device of claim 13, wherein the memory includes instructions executable by the processing logic to:
output television program recommendations including a plurality of television programs at a display device coupled to the set-top box device, when the first or second EPG data indicates that the plurality of television programs satisfy the one or more television program search criteria;
receive input indicating at least one selected television program, wherein the at least one selected television program is included in the program recommendations; and
recording the at least one selected television program or instructing a digital video recorder (DVR) to record the at least one selected television program.

16. The set-top box device of claim 11, wherein the first EPG data searched by the set-top box device is stored at the set-top box device, at an EPG server communicating with the set-top box device, or a combination thereof.

17. The set-top box device of claim 11, wherein the network is a data network or a television service provider access network and wherein the data and the additional data are received from the recurrent searching system via the data network or the television service provider access network.

18. A non-transitory computer-readable medium including processor-readable instructions that are executable by a processor to perform a method, the method comprising:
receiving input at a set-top box device specifying one or more television program search criteria;
sending data corresponding to the one or more television program search criteria from the set-top box device to a recurrent searching system via a network;
recurrently searching first electronic program guide (EPG) data that is accessible to the set-top box device based on the one or more television program search criteria, in response to a plurality of commands received from the recurrent searching system to search the EPG data; and
recording a television program that satisfies the one or more television program search criteria at the set-top box device or instructing a digital video recorder coupled to the set-top box device to record the television program, wherein the first EPG data is updated based on scheduling of television programs, and wherein the recurrent searching system performs a second search of second EPG data stored at the recurrent searching system based on the one or more television program search criteria, wherein the second search is performed when a match is found and when a match is not found in response to a lapse of a pre-determined time period and is not performed in response to an update of the second EPG data.

19. The non-transitory computer-readable medium of claim 18, further comprising receiving input specifying a change to the one or more television program search criteria and sending data corresponding to the change to the recurrent searching system.

20. The non-transitory computer-readable medium of claim 18, further comprising receiving input indicating that recurrent searching is to be discontinued and sending data to the recurrent searching system indicating that the one or more television program search criteria are to be deleted at the recurrent searching system.

* * * * *